(12) United States Patent  (10) Patent No.: US 6,201,310 B1
Adachi et al.  (45) Date of Patent: Mar. 13, 2001

(54) CAR POWER SUPPLY SYSTEM

(75) Inventors: Katsumi Adachi; Yougi Nishimura; Katsuhiko Kusumoto, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,320

(22) Filed: Sep. 24, 1999

(30) Foreign Application Priority Data

Apr. 1, 1999 (JP) .................................................. 11-095365

(51) Int. Cl.⁷ ....................................................... H02P 9/00
(52) U.S. Cl. ................................................. 290/4 C; 322/7
(58) Field of Search ..................... 290/1 R, 4 R, 290/4 A, 4 C, 50; 322/7, 8, 12, 14, 15, 17

(56) References Cited

U.S. PATENT DOCUMENTS

| 2,020,591 | * | 11/1935 | Temple . | |
| 4,347,473 | * | 8/1982 | Stroud | 320/15 |
| 4,730,097 | * | 3/1988 | Campbell et al. | 219/203 |
| 4,757,249 | * | 7/1988 | Farber et al. | 320/15 |
| 4,788,486 | * | 11/1988 | Mashino et al. | 320/17 |
| 5,254,936 | * | 10/1993 | Leaf et al. | 322/90 |
| 5,739,676 | * | 4/1998 | Judge et al. | 322/22 |
| 6,066,897 | * | 5/2000 | Nakamura | 290/4 A |

FOREIGN PATENT DOCUMENTS 4-197065  7/1992  (JP) .

* cited by examiner

Primary Examiner—Nicholas Ponomarenko
(74) Attorney, Agent, or Firm—Sughrue, Mion, Zinn, Macpeak & Seas, PLLC

(57) ABSTRACT

A car power supply system which can improve the installation freedom of an engine and safety against crash and obtain high output for a large-capacity electric load.

The car power supply system comprising:
 first and second generators which are smaller in size than a generator which is large in size and obtains high output for a large-capacity electric load by itself; and
 a controller which causes the first generator to generate power by the start of an engine and causes the second generator to generate power when it detects that a vehicle is braked, wherein
 high output is obtained for the large-capacity electric load with the first and second generators.

20 Claims, 9 Drawing Sheets

CAR POWER SUPPLY SYSTEM

BACKGROUND OF THE INVENTION

1. Field of the Invention

The present invention relates to a car power supply system comprising a plurality of generators.

2. Description of the Prior Art

FIG. 7 is a sectional view of a car AC generator of the prior art. This AC generator comprises a case 3 formed by connecting an aluminum front bracket 1 and an aluminum rear bracket 2 by a bolt 3B, a generator shaft 5 provided in the case 3 and fitted with a pulley 4 for receiving the torque of an engine transmitted from a belt at one end, a randol type rotor 6 fixed to the generator shaft 5, fans 6F fixed to both side of the rotor 6, a stator 7A fixed on the inner wall of the case 3, slip rings 8, fixed to the other end of the generator shaft 5, for supplying a current to the rotor 6, a pair of brushes 9 and 9 which slide in contact with the slip rings 8, a brush holder 10 for storing the brushes 9 and 9, a rectifier 11, electrically connected to the stator 7A, for rectifying an AC generated in the stator 7A into a DC, a heat sink 12 attached to the brush holder 10, and a regulator 13, attached to the heat sink 12, for regulating an AC voltage generated in the stator 7A. Denoted by 14a and 14b are bearings, and 15 brackets for connecting the AC generator to the engine.

The above rotor 6 comprises a rotor coil 6A for generating a magnetic flux with a current supplied and a pole core 6B for covering the rotor coil 6A and forming a magnetic pole with the magnetic flux. The pole core 6B consists of a pair of pole core unit 6x and a pole core unit 6y which engage with each other. The pole core units 6x and 6y are made from iron and have claw-like magnetic poles 62 and 62, respectively.

The stator 7A comprises a stator core 17A and a stator coil 17B formed of a conductor wound round the stator core 17A. An AC is generated in the stator coil 17B by the rotation of the rotor 6 according to changes in the magnetic flux from the rotor coil 6A.

In the car AC generator constituted above, a current is supplied to the rotor coil 6A from a battery (unshown) through the brushes 9 and 9 and the slip rings 8 to generate a magnetic flux. Meanwhile, the pulley 4 is driven by the engine and the rotor 6 is turned by the generator shaft 5, thereby giving a rotating field to the stator coil 17B to generate electromotive force in the stator coil 17B. This AC electromotive force is rectified into a DC by the diodes 16 and 16 of the rectifier 11, the DC is regulated by the regulator 13, and the regulated DC is charged into the battery and supplied to electric loads.

FIG. 8 is a sectional view of a car brushless AC generator of the prior art. The same or corresponding elements as those of FIG. 7 are given the same reference symbols and their descriptions are omitted. In the case of this car brushless AC generator, when the engine is started, an excitation current is supplied from the battery to an excitation coil incorporated in an excitation core 19 and the pole core units 6x and 6y of the rotor 6 are turned by the rotation of the generator shaft 5, whereby electromotive force is generated in the stator coil 17B of the stator 7A. This AC electromotive force is rectified into a DC by the diodes 16 and 16 of the rectifier 11, the DC is regulated by the regulator 13A, and the regulated DC is charged into the battery and supplied to electric loads.

FIG. 9 is a diagram showing a car power supply system of the prior art comprising the generator shown in FIG. 7 and FIG. 8.

The generator 20 for supplying power to the electric loads of a vehicle is connected to an engine E by the above brackets 15 and attachment arms 15A. A belt 20b is stretched between the pulley 20a of the generator 20 and the pulley Fa of the crank shaft F of the engine E.

When the engine E is started, an excitation current is supplied to the rotor coil 6A of the generator 20 and the generator shaft 5 is turned by the belt 20b for transmitting the torque of the engine E to start the power generation of the generator 20.

SUMMARY OF THE INVENTION

Since the output of the generator is determined by the size ($D^2$ (outer diameter of rotor) L (length of stator)) of the generator, a large-sized generator is required to obtain high output for a large-capacity electric load.

However, when a large-sized generator is used, the installation freedom of the engine is small and there is a good possibility that the generator may crash into the cabin at the time of a car crash. That is, there has been problems with the installation freedom of the engine and safety against crash.

It is therefore an object of the present invention which has been made to solve the above problems to provide a car power supply system which can improve the installation freedom of an engine and safety against crash and can obtain high output for a large-capacity electric load.

According to a first aspect of the present invention, there is provided a car power supply system comprising first and second generators which are smaller in size than a generator which is large in size and obtains high output for a large-capacity electric load by itself and a controller which causes the first generator to generate power by the start of the engine and causes the second generator to generate power when it detects that a vehicle is braked, wherein high output is obtained for the large-capacity electric load with the first and second generators.

When it is detected that the voltage of a battery loaded on the vehicle falls below a predetermined value, the second generator is caused to generate power, thereby making it possible to obtain high output for a large-capacity electric load with the first and second generators.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

A car power supply system according to Embodiment 1 of the present invention will be described hereinunder with reference to FIG. 1 and FIG. 2.

Figure 1:
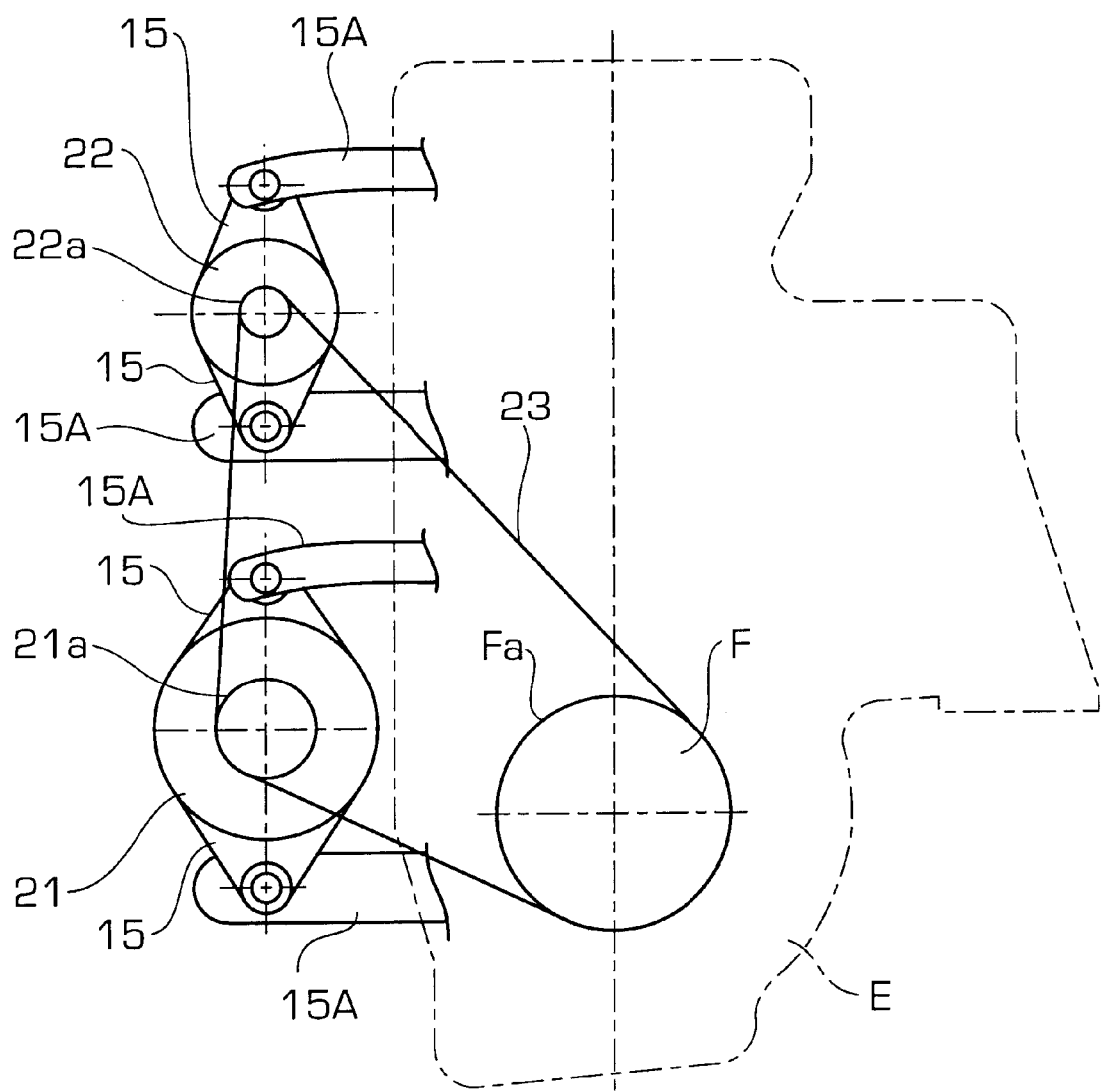
FIG. 1 is a structural diagram of a car power supply system according to Embodiment 1 of the present invention.
Figure 2:
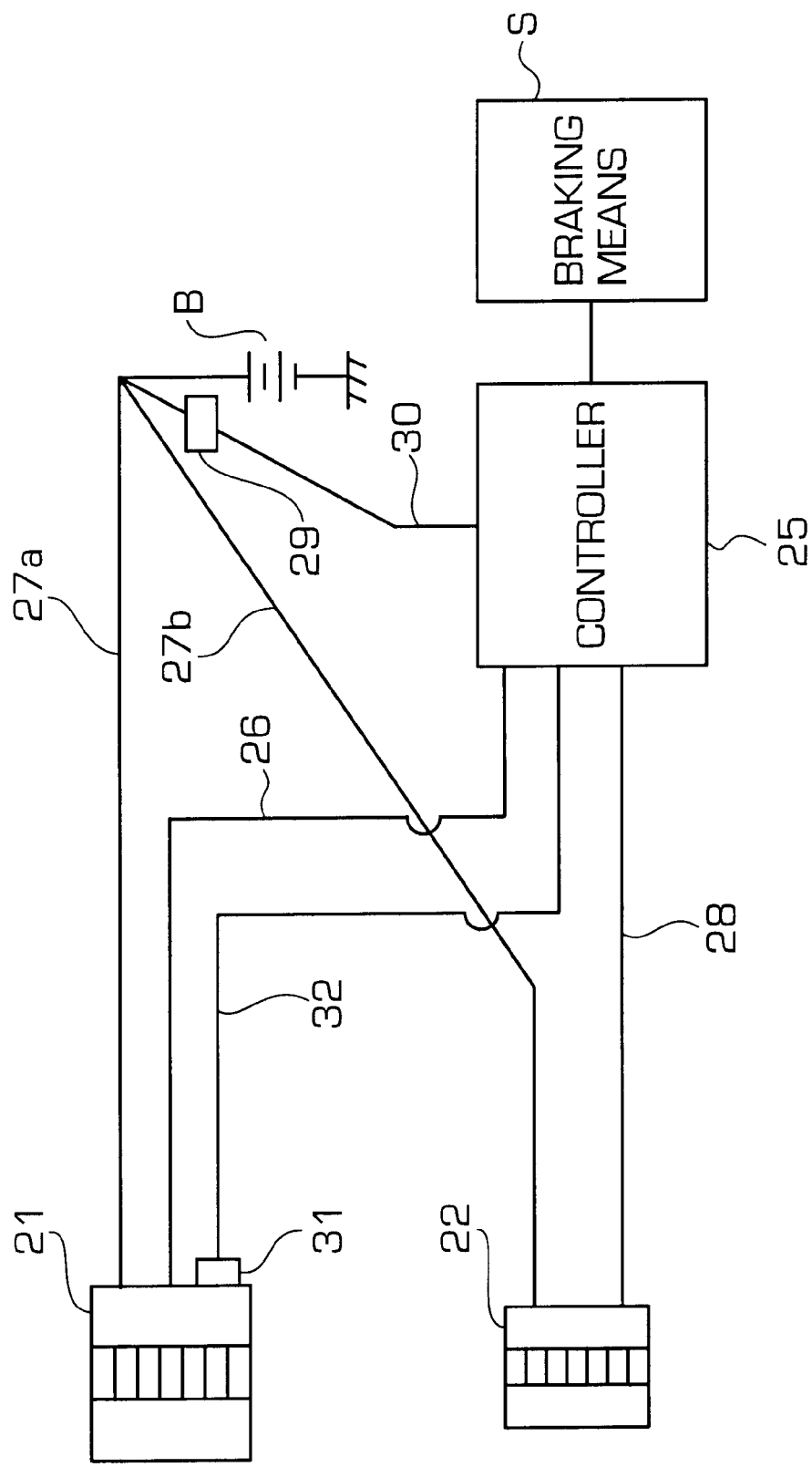
FIG. 2 is a block diagram showing the control system of a controller according to Embodiments 1, 2 and 3 of the present invention.
Figure 9:
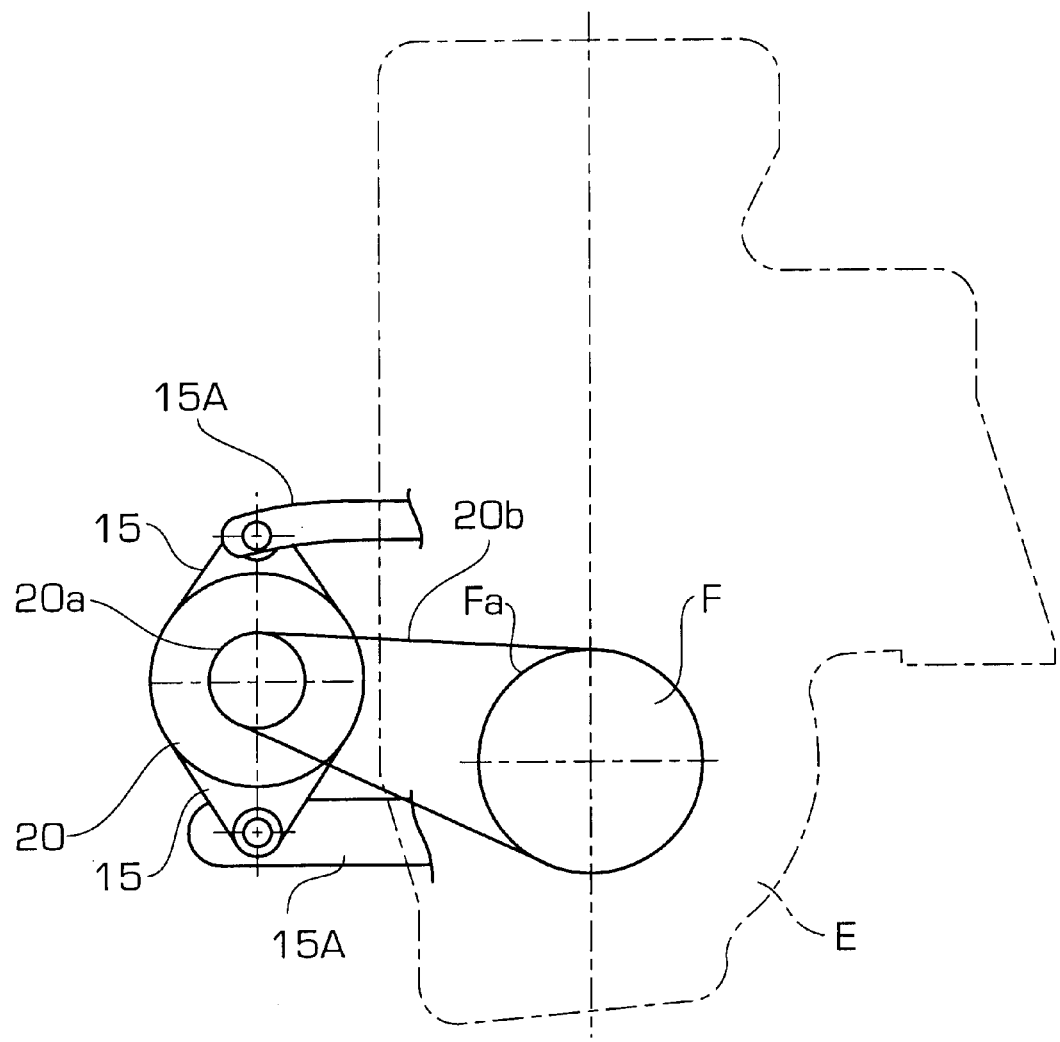
FIG. 9 is a structural diagram of a car power supply system of the prior art.

FIG. 1 is a diagram showing the configuration of a car power supply system according to Embodiment 1 of the present invention. The same or corresponding elements as those of the prior art shown in FIG. 9 are given the same reference symbols.

Reference numeral 21 denotes a first generator which is smaller in size than a generator which has been required to obtain high output. Denoted by 22 is a second generator which is smaller in size than the first generator. The first generator 21 and the second generator 22 are connected to the engine E by brackets 15 and attachment arms 15A independently. The engine E can be thereby installed wide apart from the first generator 21, the second generator 22 and the cabin, whereby the installation freedom of the engine and safety against crash can be improved.

A belt 23 is stretched between the pulley 21a of the first generator 21 and the crank shaft F of the engine E to transmit the torque of the engine E to the pulley 21a. When the engine E is started, an excitation current is supplied to the rotor coil 6A of the first generator 21 by the control of a controller which will be described later while the power generation of the first generator 21 is carried out by the rotation of the generator shaft 5 by the belt 23 for transmitting the torque of the engine E.

The pulley 22a of the second generator 22 has a smaller diameter than that of the pulley 21a of the first generator 21 and the above belt 23 is also stretched around this pulley 22a. That is, the belt 23 is stretched among the crank shaft F, the pulley 21a of the first generator 21 and the pulley 22a of the second generator 22. However, the first generator 21 and the second generator 22 generate power independently.

In this Embodiment 1, when it is detected that a vehicle is braked, the second generator 22 is caused to generate power. This power generation will be described with reference to FIG. 2.

As described above, when the engine E is started, an ON signal is transmitted from the controller 25 to the first generator 21 through a signal line 26, and an excitation current is thereby supplied from the battery B to the rotor coil 6A of the first generator 21 through a cable 27a. Thereby, the first generator 21 generates power. That is, the first generator 21 generates power for supplying electricity to a car electric load.

When a signal indicating that the vehicle or the engine is braked is supplied from braking means S such as a foot brake or gear to the controller 25, an ON signal is transmitted to the second generator 22 from the controller 25 through a signal line 28, and an excitation current is thereby supplied to the rotor coil 6A of the second generator 22 through a cable 27b to cause the second generator 22 to generate power. The time of supplying the ON signal to the second generator 22 may be determined arbitrarily.

That is, when a signal indicating that the vehicle or the engine is braked is not supplied to the controller 25 from the braking means S, the ON signal is not applied to the second generator 22 from the controller 25 and hence, an excitation current does not run to the rotor coil 6A of the second generator 22. Therefore, the second generator 22 does not generate power, and the generator shaft 5 idles by torque transmitted by the pulley 22a.

In this Embodiment 1, when the vehicle is braked, the second generator 22 is caused to generate power, thereby increasing the load of the engine E to grow braking force and converting this load into electric energy. That is, the second generator 22 is used as a generator for regenerative braking. Since the pulley 22a of the second generator 22 has a small diameter and the size of the second generator 22 is smaller than that of the first generator 21, high output can be obtained due to high-speed rotation with small torque.

In this Embodiment 1, the first generator is caused to carry out general power generation and the second generator is caused to generate power only when the vehicle is braked.

Therefore, according to this Embodiment 1, since first and second generators 21 and 22 smaller in size than a generator which has been required to obtain high output are used, the installation freedom of the engine and safety against crash can be improved. Further, since the second generator 22 is caused to generate power when it is detected that the vehicle is braked, a car power supply system capable of obtaining high output for a large-capacity electric load can be obtained.

By causing the second generator 22 to generate power when the vehicle is braked, the load of the engine E is increased. That is, as the second generator 2 is used as a generator for regenerative braking, braking force can be increased.

Embodiment 2

In Embodiment 1, when it is detected that the vehicle is braked, the second generator 22 is caused to generate power. When the voltage of a battery falls below a predetermined value, the second generator may be caused to generate power.

This Embodiment 2 will be described hereinunder with reference to FIG. 2.

A voltage detection sensor 29 is used as voltage detection means for detecting the voltage of the battery B. When the controller 25 receives a voltage detection signal from the voltage detection sensor 29 through a signal line 30 indicating that the voltage of the battery B falls below a predetermined value, it causes the second generator 22 to generate power. That is, when the electric load of the vehicle becomes large due to the use of an air conditioning system, the voltage value of the battery B falls. When the voltage value of the battery B falls below the predetermined value, the second generator 22 is caused to generate power.

Therefore, according to Embodiment 2, the installation freedom of the engine and safety against crash can be improved and a car power supply system capable of obtaining high output for a large-capacity electric load can be obtained as in Embodiment 1.

Embodiments 1 and 2 may be combined.

In Embodiments 1 and 2, the second generator 22 which is smaller in size than the first generator 21 and whose pulley 22a has a smaller diameter than the pulley 21a of the first generator 21 is used. A second generator 22 which is the same in size as the first generator 21 and whose pulley 22a has a smaller diameter than the pulley 21a of the first generator 21 may be used. Further, a second generator 22 which is the same in size as the first generator 21 and whose pulley 22a has the same diameter as the pulley 21a of the first generator 21 may be used. Generally speaking, higher output can be obtained by using a second generator 22 whose pulley 22a has a smaller diameter than the pulley 21a of the first generator 21 when the engine speed is the same. Therefore, it is desired to use a second generator 22 whose pulley 22a has a smaller diameter than the pulley 21a of the first generator 21.

Embodiment 3

When it is detected that the first generator 21 fails and cannot generate power, the second generator 22 may be caused to generate power.

Embodiment 3 will be described hereinunder with reference to FIG. 2.

When the controller 25 receives a failure detection signal from a failure detection sensor 31 as failure detection means for detecting a failure caused by the internal disconnection of the first generator 21 through a signal line 32, it causes the second generator 22 to generate power.

Therefore, according to Embodiment 3, the same effect as that of Embodiments 1 and 2 can be obtained. Since the second generator 22 is caused to generate power when the first generator 22 fails, the second generator 22 charges the battery B and supplies power to a car electric load even if the first generator 21 fails. Therefore, such a situation that the vehicle cannot be started and operated due to the quick discharge of the battery B can be avoided. Since power cannot be supplied to the large electric load if the power generation of the second generator 22 continues for a long time, the first generator 21 must be exchanged as soon as possible.

Embodiment 4

Figure 3:
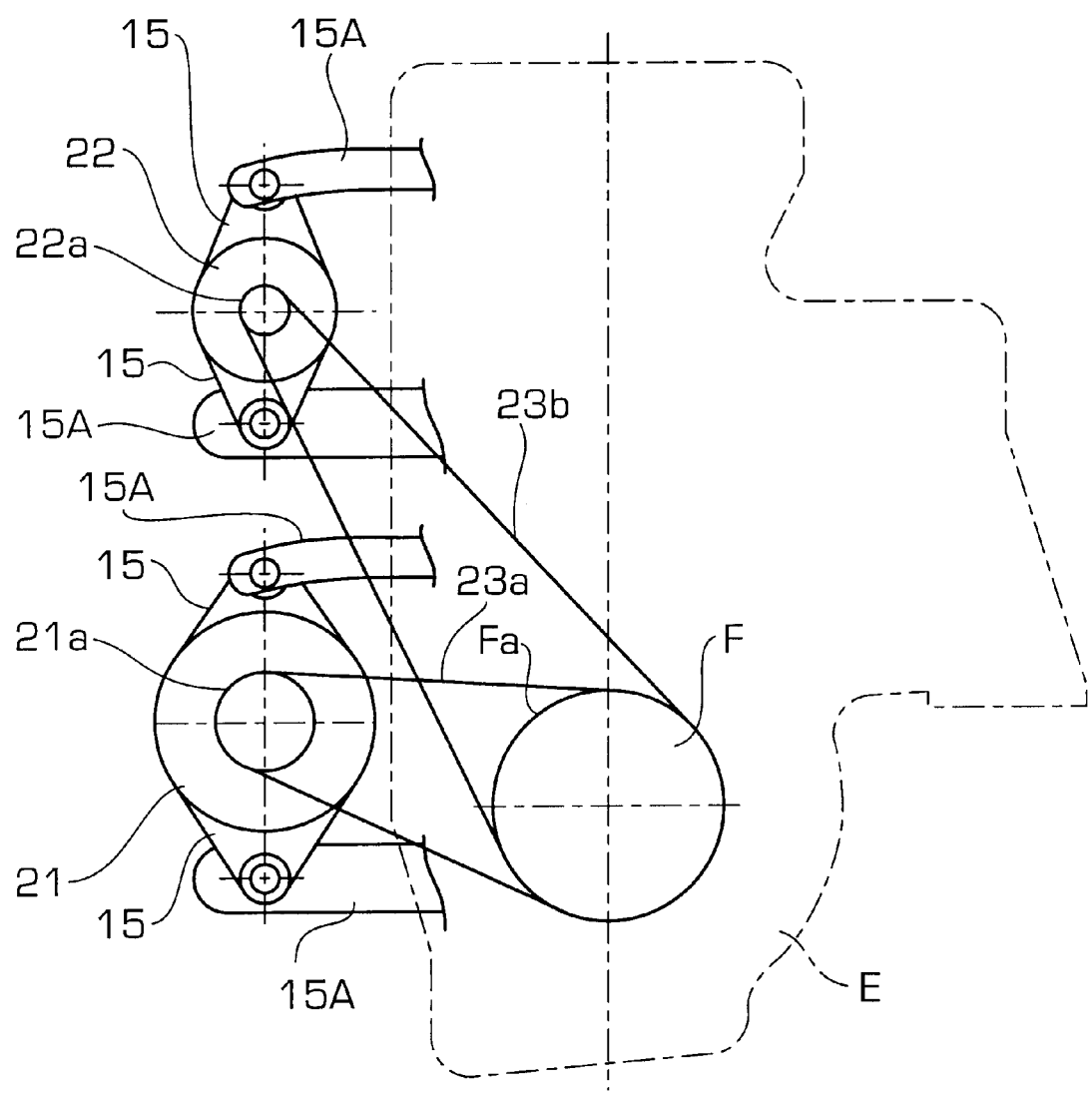
FIG. 3 is a structural diagram of a car power supply system according to Embodiment 4 of the present invention.

In Embodiments 1 to 3, a single belt 23 is stretched between the pulleys of the first generator and the second generator. In Embodiment 4, when the belt is broken, power cannot be generated at all. To cope with this, as shown in FIG. 3, different belts 23a and 23b are stretched around the pulley 21a of the first generator 21 and the pulley 22a of the second generator 22, respectively. Even if the belt 23b is broken, power generation can be carried out by the first generator 21, thereby making it possible to eliminate the quick discharge of the battery B.

If the belt 23a is broken, the above-described controller detects the breakage of the belt 23a and causes the second generator 22 to generate power, thereby making it possible to eliminate the quick discharge of the battery B.

If the belt is left broken, high output cannot be obtained for a large-capacity electric load. Therefore, the broken belt must be exchanged as soon as possible.

In Embodiment 4, the pulley Fa of the crank shaft F must have a double structure for the belts 23a and 23b.

Embodiment 5

To reduce the abrasion of the belt, a one-way clutch 40 (see FIG. 4 and FIG. 6) may be provided in the pulley 22a of the second generator 22 as means for transmitting the turning force of the belt in only one direction.

Figure 5:
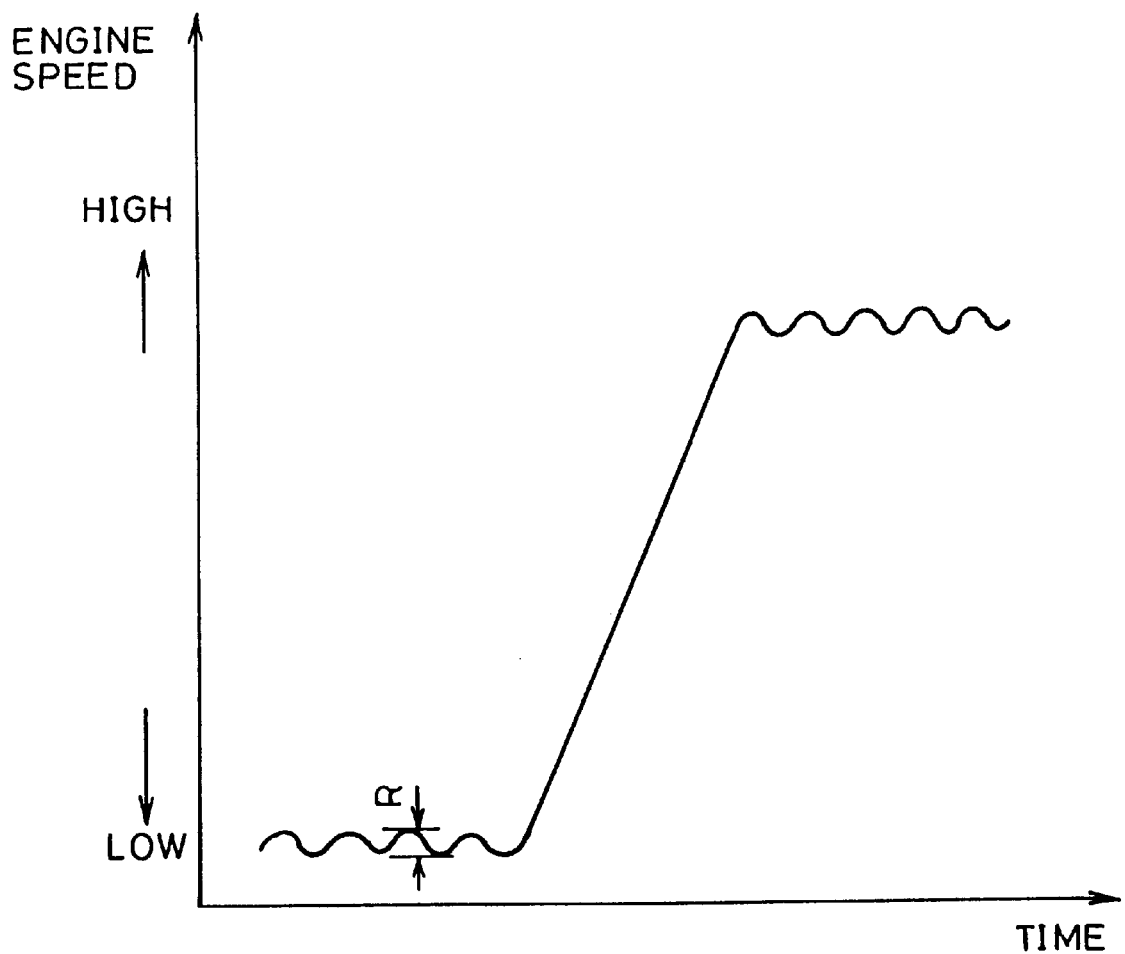
FIG. 5 is a diagram for explaining Embodiment 5 of the present invention.

As shown in FIG. 5, since explosive ripples Rare produced by the rotation of the engine, torque in normal and opposite directions is applied to the belt microscopically. Therefore, the rotation in an opposite direction of the pulleys of the first and second generators 21 and 22 and the crank shaft F of the engine E is absorbed by the one-way clutch 40 to eliminate a slip between each of the pulleys and the belt, thereby preventing the generation of a belt slipping sound or the breakage of the belt.

Since the engine speed sharply rises or the driving torque of the second generator 22 sharply grows when the engine is braked, the one-way clutch 40 is preferably provided in at least the pulley 22a of the second generator 22.

Figure 4:
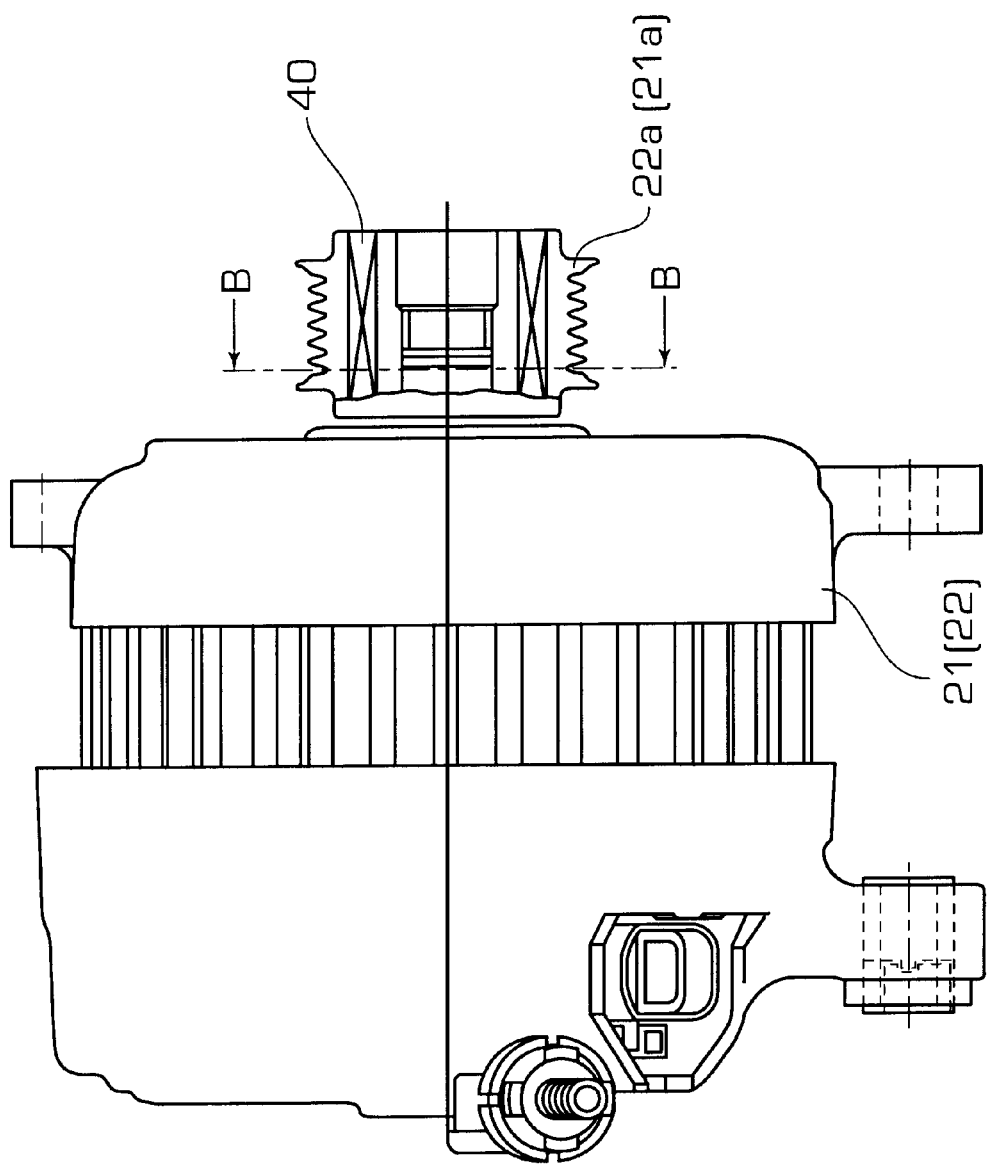
FIG. 4 is a diagram for explaining Embodiment 5 of the present invention.
Figure 6:
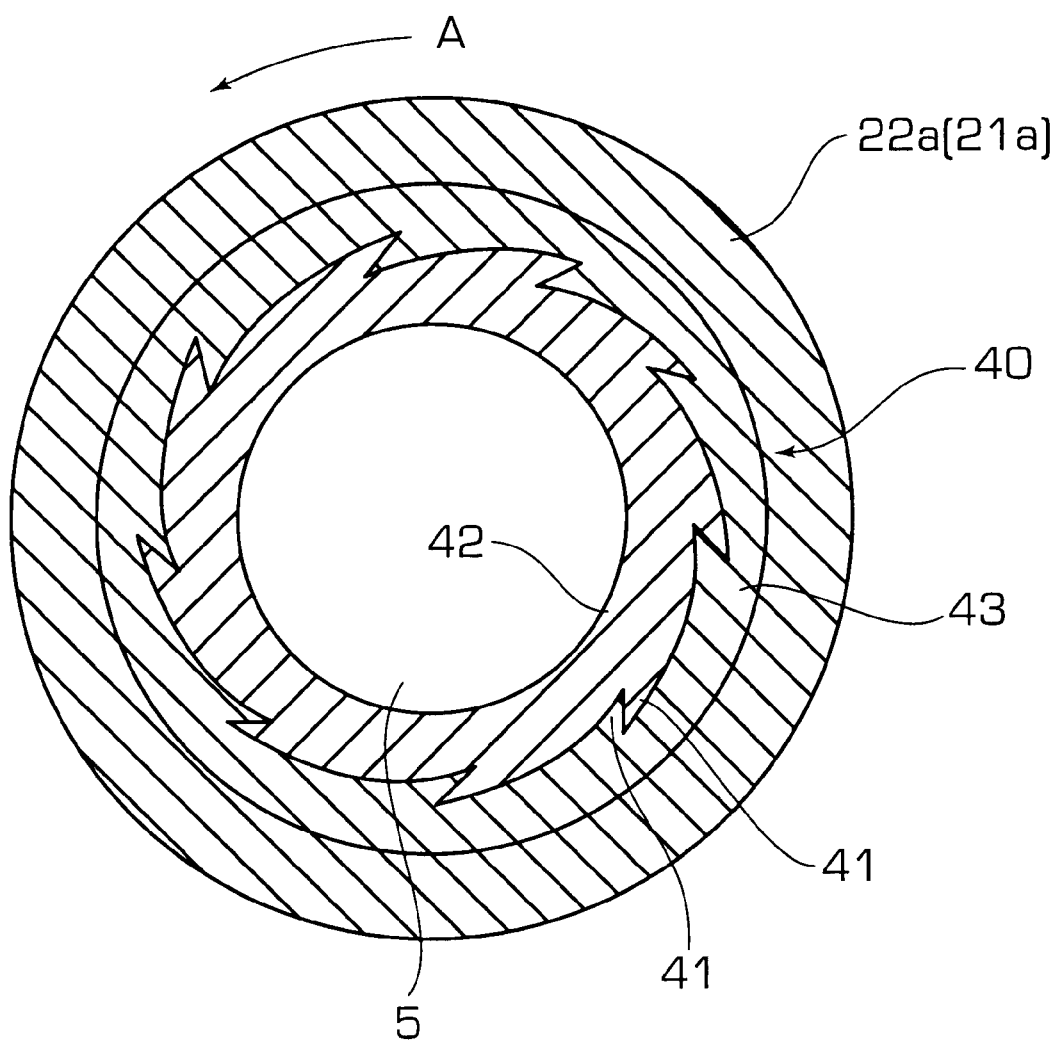
FIG. 6 is a sectional view cut on line B—B of FIG. 4.
Figure 7:
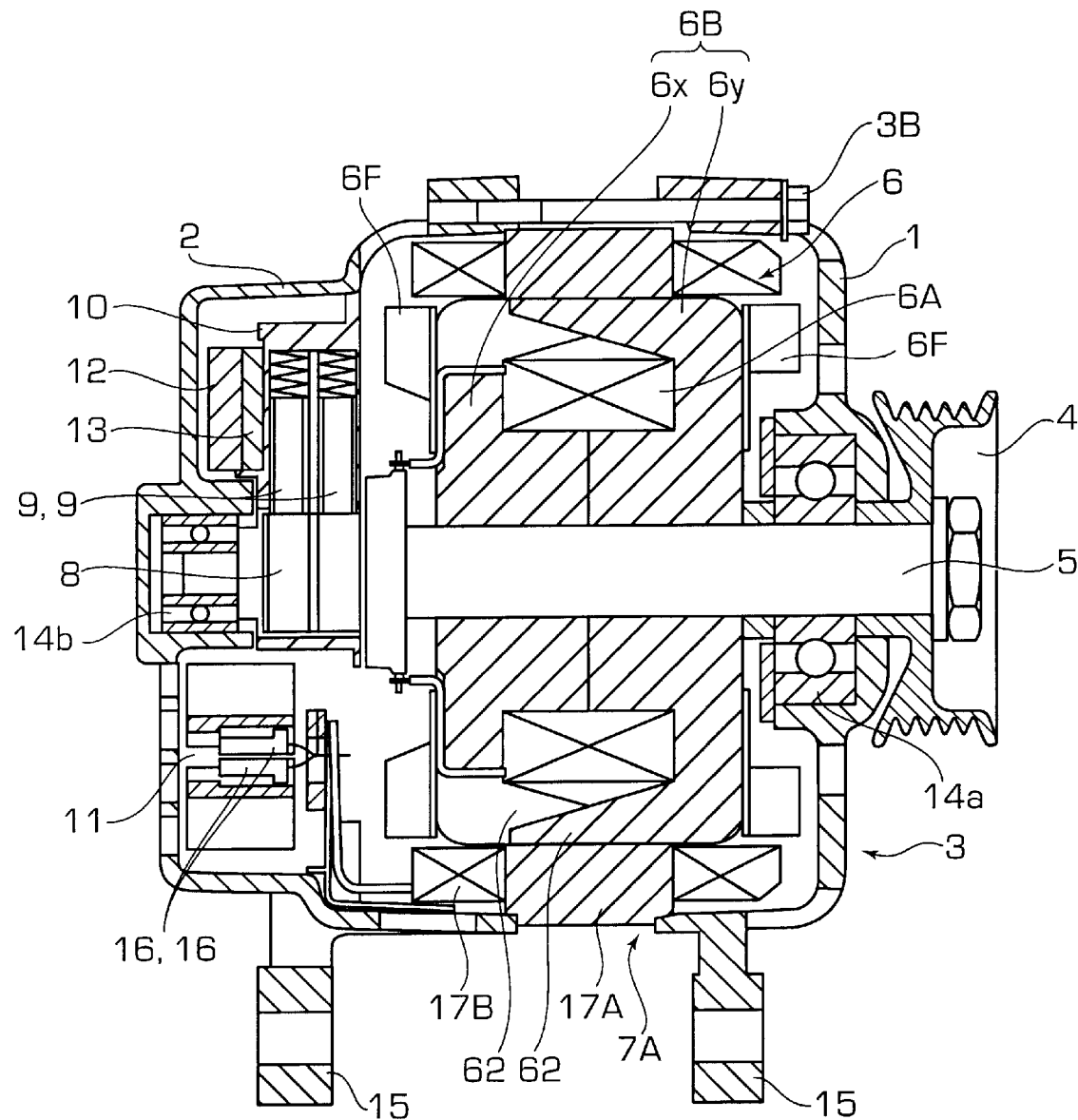
FIG. 7 is a sectional view of a car AC generator of the prior art.
Figure 8:
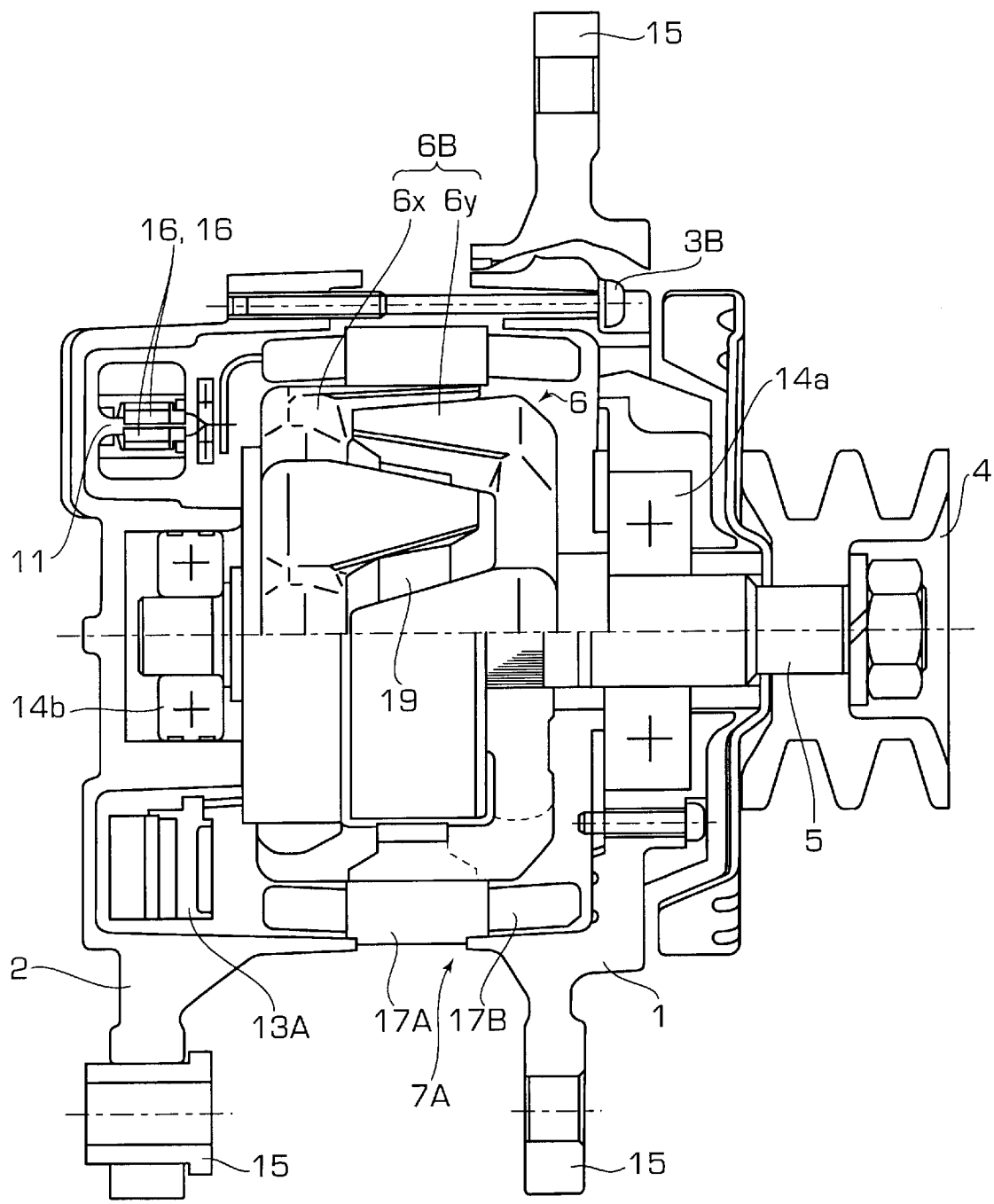
FIG. 8 is a sectional view of a car brushless AC generator of the prior art.

Clutch plates 42 and 43 having claws 41 are provided as the one-way clutch 40 in the generator shaft 5 and the pulley 22a to transmit the turning force of the belt in only one direction A as shown in FIG. 6 (sectional view cut on B—B of FIG. 4).

According to Embodiment 5, the generation of a belt slipping sound and the breakage of the belt can be prevented.

Embodiment 6

In the above second generator 22, the pulley 22a and the generator shaft 5 can be connected or disconnected by an electromagnetic clutch so that the pulley 22a of the second generator 22 is disconnected from the generator shaft 5 by the controller when the second generator 22 is not caused to generate power.

According to Embodiment 6, when the second generator 22 is not caused to generate power, the generator shaft 5 is not idled, thereby making it possible to reduce the abrasion of the bearings 14a and 14b of the second generator 22.

As having been described above, according to the present invention, a car power supply system which can improve the installation freedom of the engine and safety against crash and can obtain high output for a large-capacity electric load is obtained. In addition, such a situation that the battery is discharged right away can be avoided, the generation of a belt slipping sound and the breakage of the belt can be prevented, and the abrasion of the bearings in the generator can be reduced.

What is claimed is:

1. A car power supply system comprising:
   first and second generators which are smaller in size than a generator which is large in size and obtains high output for a large-capacity electric load by itself; and
   a controller which causes the first generator to generate power by the start of an engine and causes the second generator to generate power when it detects that a vehicle is braked, wherein
   high output is obtained for the large-capacity electric load with the first and second generators.

2. The car power supply system according to claim 1, wherein the controller causes the second generator to generate power when it detects a failure of the first generator.

3. The car power supply system according to claim 1, wherein a belt extending from the pulley of an engine crank shaft is stretched between pulleys for transmitting torque to the shafts of the first and second generators.

4. The car power supply system according to claim 3, wherein the second generator has a pulley with a smaller diameter than that of the pulley of the first generator.

5. The car power supply system according to claim 3, wherein all or any one of the pulleys of the generators and the engine crank shaft has transmission means for transmitting the turning force of the belt in only one direction.

6. The car power supply system according to claim 4, wherein the pulley and the generator shaft of the second generator can be connected and disconnected by an electromagnetic clutch and the pulley and the generator shaft are disconnected from each other when the second generator is not caused to generate power.

7. The car power supply system according to claim 1, wherein different belts extending from the pulley of an engine crank shaft are stretched around pulleys for transmitting torque to the shafts of the first and second generators, independently.

8. The car power supply system according to claim 7, wherein the second generator has a pulley with a smaller diameter than that of the pulley of the first generator.

9. The car power supply system according to claim 7, wherein all or any one of the pulleys of the generators and the engine crank shaft has transmission means for transmitting the turning force of the belt in only one direction.

10. The car power supply system according to claim 8, wherein the pulley and the generator shaft of the second generator can be connected and disconnected by an electro-magnetic clutch and the pulley and the generator shaft are disconnected from each other when the second generator is not caused to generate power.

11. A car power supply system comprising:
first and second generators which are smaller in size than a generator which is large in size and obtains high output for a large-capacity electric load by itself; and
a controller which causes the first generator to generate power by the start of an engine and causes the second generator to generate power when it detects that the voltage of a battery mounted on a vehicle falls below a predetermined value, wherein
high output is obtained for the large-capacity electric load with the first and second generators.

12. The car power supply system according to claim 11, wherein the controller causes the second generator to gene power when it detects a failure of the first generator.

13. The car power supply system according to claim 11, wherein a belt extending from the pulley of an engine crank shaft is stretched between pulleys for transmitting torque to the shafts of the first and second generators.

14. The car power supply system according to claim 13, wherein the second generator has a pulley with a smaller diameter than that of the pulley of the first generator.

15. The car power supply system according to claim 13, wherein all or any one of the pulleys of the generators and the engine crank shaft has transmission means for transmitting the turning force of the belt in only one direction.

16. The car power supply system according to claim 14, wherein the pulley and the generator shaft of the second generator can be connected and disconnected by an electro-magnetic clutch and the pulley and the generator shaft are disconnected from each other when the second generator is not caused to generate power.

17. The car power supply system according to claim 11, wherein different belts extending from the pulley of an engine crank shaft are stretched around pulleys for transmitting torque to the shafts of the first and second generators, independently.

18. The car power supply system according to claim 17, wherein the second generator has a pulley with a smaller diameter than that of the pulley of the first generator.

19. The car power supply system according to claim 17, wherein all or any one of the pulleys of the generators and the engine crank shaft has transmission means for transmitting the turning force of the belt in only one direction.

20. The car power supply system according to claim 18, wherein the pulley and the generator shaft of the second generator can be connected and disconnected by an electro-magnetic clutch and the pulley and the generator shaft are disconnected from each other when the second generator is not caused to generate power.

* * * * *